Sept. 11, 1951 R. O. HOLBROOK 2,567,377
AUTOMATIC FOCUS CONTROL MEANS FOR CATHODE-RAY TUBES
Filed Dec. 6, 1949
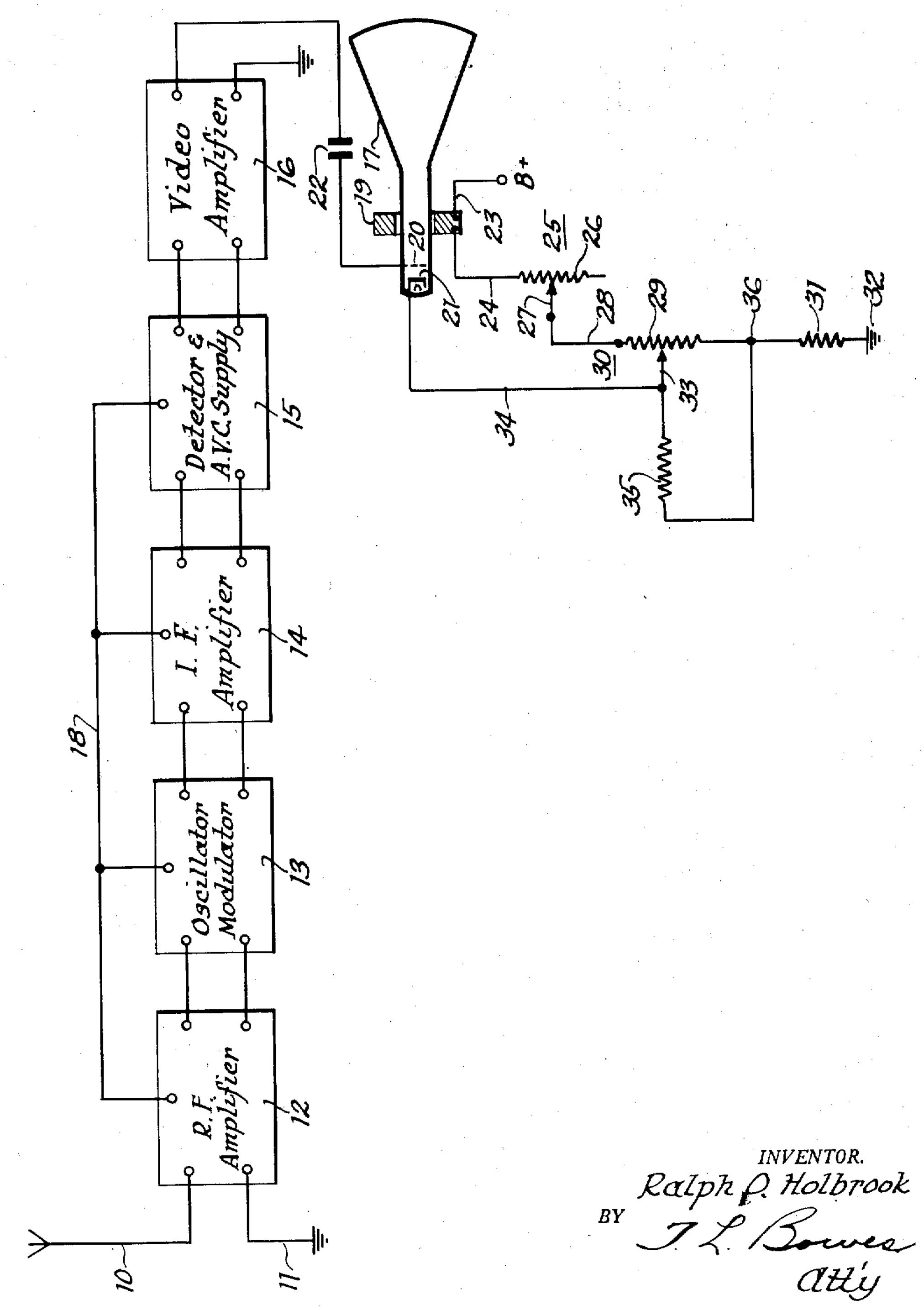
INVENTOR.
Ralph O. Holbrook
BY T. L. Bowes
Att'y Patented Sept. 11, 1951 2,567,377

UNITED STATES PATENT OFFICE 2,567,377

AUTOMATIC FOCUS CONTROL MEANS FOR CATHODE-RAY TUBES

Ralph O. Holbrook, Takoma Park, Md., assignor to Stromberg-Carlson Company, a corporation of New York Application December 6, 1949, Serial No. 131,362

4 Claims. (Cl. 315—31)

This invention relates to automatic focus control for cathode ray tubes, more particularly to means for automatically controlling the focusing of picture tubes for television receivers over a wide range of brightness settings, and the invention has for an object the provision of improved automatic control apparatus of the above character.

In television receivers heretofore known, the brightness and the focus control means for picture tubes or cathode ray tubes of the magnetic focus type have included adjustable means so connected either in series or parallel relation that the focus control means have been wholly independent of the brightness control, with the result that changes in the brightness control means after proper focusing of the picture tube have resulted in defocusing, therefore requiring readjustment of the focusing means for each change in the brightness adjustment beyond a relatively small range. Since adjustment of the brightness control is required by the different visual conditions encountered in day and night usage of television apparatus and by the different visual characteristics or capacities of the users, the necessity for adjustment of the focus for each major variation of the brightness or intensity has occasioned difficulties, and it is accordingly a further object of the present invention to provide reliable and economical means for automatically maintaining the focus of the cathode ray or picture tube over a wide range of variation of brightness while at the same time permitting proper initial adjustment of the focus at any setting of the brightness control.

In carrying out the invention in one form, a magnetic focus type cathode ray tube having independent focus and brightness control means is provided with additional control means effectively operable by the brightness control means for maintaining the tube in focus over a wide range of adjustment of the brightness control means. More particularly, the focus control means includes a pair of adjustable potentiometers, so arranged that the focus control circuit includes an adjustable portion of one of the potentiometers and a constant portion of the other, and an adjustable portion of the other potentiometer is connected to control the brightness by applying a variable bias-voltage to the tube. Automatic control of the focus is obtained, in accordance with the present invention, by connecting additional impedance means in parallel circuit relation with the adjustable portion of the brightness control potentiometer, which impedance means is effective to vary the current flow in the focus controlling circuit upon adjustment of the brightness controlling potentiometer, thereby to maintain the tube in focus over a wide range of brightness adjustment.

For a more complete understanding of the invention, reference should now be had to the drawing, in which the single figure constitutes a diagrammatic representation of a portion of a television receiver, including a picture or cathode ray tube provided with brightness and focus control means embodying the present invention.

Referring now to the drawing, the invention is shown for purposes of illustration as embodied in a television receiver of the superheterodyne type, including an antenna and ground system 10 and 11 connected to a radio frequency amplifier 12, to which are connected in cascade, as shown, and in the order named, an oscillator modulator 13, an intermediate frequency amplifier 14, a detector and AVC supply 15, a video frequency amplifier 16, and a cathode ray, signal reproducing tube, or picture tube 17, which elements constitute the main or video signal channel of the receiver. The unidirectional bias voltage developed by the AVC supply 15 is applied by suitable leads 18 to one or more of the control grids of the tubes contained in the preceding stages of the signal channel in a conventional manner, and since the elements or components 10 to 16, inclusive, are all of conventional well known construction, no detailed illustrations and descriptions thereof are deemed necessary.

As shown, the picture tube 17 includes the usual focusing coil 19, a main or video control grid 20, and a cathode 21, the control grid 20 being connected through suitable coupling means, such as the condenser 22, to the output of the video amplifier 16. It will be understood, of course, that the tube 17 likewise includes the usual additional elements such as first and second anodes, a fluorescent screen at the end of the tube opposite the cathode 21, and suitable deflecting or scanning means, but since these additional elements are well known in the art and constitute no part of the present invention, it is not deemed necessary to illustrate or describe either these elements or the various control circuits therefor, which may likewise be entirely conventional.

As shown in the drawing, the focusing coil 19 of the picture tube 17 is connected in a focusing control circuit which extends from a suitable source of potential, represented by the symbol B+, through a conductor 23, the focusing coil 19, a conductor 24, a focus controlling potentiometer 25 consisting of the usual resistance element 26 and adjustable contact 27, a conductor 28 and the constant resistance portion 29 of a brightness controlling potentiometer 30, and by way of a fixed resistor 31 to a suitable ground connection 32. The brightness controlling potentiometer is provided with the usual adjustable contact for arm 33, which is connected through a suitable conductor 34 to the cathode 21 of the tube 17, so as to apply an adjustable bias voltage thereto, and in accordance with the present invention a suitable resistor or impedance 35 is connected between the adjustable arm 33 of the potentiometer 30 and the lower terminal 36 of the resistance element 29, so as to be effectively connected in parallel with the adjustable portion of the potentiometer 30 which is included in both the brightness control and focus control circuits as heretofore described.

It will be apparent that, by adjustment of the movable arm 27 of the potentiometer 25, the current flow through the focusing coil 19 may be adjusted so as to bring the tube 17 into focus, and it will likewise be apparent that adjustment of the movable arm 33 of the potentiometer 30 is effective to adjust the bias on the cathode 21 of the tube 17 so as to provide a range of brightness which varies between a desired low intensity and high intensity picture. Since adjustment of the movable arm 33 does not of itself change the effect of the resistance 29 in so far as the focusing control circuit is concerned, changing the brightness adjustment would result in defocusing of the tube were it not for the automatic control effected by the resistor or impedance 35. This impedance 35, however, which is connected in the focusing control circuit in parallel circuit relation, as heretofore described, with the adjustable portion of the potentiometer 30, will be gradually shunted out as the arm 33 approaches the terminal 36 and the effect of the resistor 35 on the focusing control circuit will therefore vary so as to maintain the tube in focus.

The resistor 31 is given a value such that the current flow in the focus control circuit will be at the necessary value to maintain the tube 17 in focus for the maximum brightness setting which occurs when the impedance 35 has been completely shorted out, leaving only the resistor 31, the potentiometer resistor 29, and a portion of the potentiometer resistor 26 in the focus control circuit.

In one application of the invention, wherein the tube 17 took the form of a conventional twelve-inch picture tube of the magnetic focus type, the potentiometer resistors 26 and 29 were respectively given values of 5,000 ohms and 2,000 ohms, the impedance 35 took the form of a 1,000 ohm resistor, the resistor 31 had a value of 820 ohms, and the source of energy B+ constituted a 400 volt source, it was found that the tube 17, after having been properly focused by adjustment of the arm 27, remained in focus during adjustment of the brightness between a biasing potential of 38 volts and 18 volts, the brightness variation thereby effected ranging from a picture of low brightness to one of very high intensity. When conventional prior art focusing and brightness controlling arrangements were employed in connection with the same tube, it was not possible to maintain the tube in focus over a range of more than six volts biasing potential, which constitutes approximately one-third of the range provided by control means embodying this invention.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. In a control apparatus for a magnetic-focus cathode ray tube having independently adjustable potentiometer means for respectively controlling the brightness and the focus of said tube, said potentiometer means being connected in series circuit relation to form a focus control circuit comprising a constant portion of said brightness controlling potentiometer means and an adjustable portion of said focus potentiometer means and a brightness control circuit comprising the combination of impedance means connected in parallel circuit relation with an adjustable portion of said brightness controlling potentiometer means for maintaining said tube in focus over a wide range of brightness adjustment.

2. Control apparatus for a magnetic-focus cathode ray tube comprising, adjustable impedance means for controlling the current flow through the focus coil of said tube, independently adjustable brightness controlling impedance means for controlling the bias voltage applied to said tube, and additional impedance means adjustable by said brightness controlling means for controlling the current flow through said coil to maintain said tube in focus over a wide range of brightness adjustment.

3. Control apparatus for a magnetic-focus cathode ray tube having a focus coil, comprising a pair of adjustable potentiometers, means connecting an adjustable portion of one of said potentiometers and a constant portion of the other of said potentiometers in circuit with said coil to provide a focus controlling circuit wherein the current flow through said coil is adjustable by said one potentiometer, means connecting an adjustable portion of said other potentiometer to said tube for applying a brightness controlling variable bias voltage thereto, and impedance means in said focus controlling circuit effectively adjustable by adjustment of said other potentiometer for varying said current flow to maintain said tube in focus over a wide range of brightness adjustment.

4. Control apparatus for a magnetic-focus cathode ray tube having a focus coil, comprising a pair of adjustable potentiometers, means connecting an adjustable portion of one of said potentiometers and a constant portion of the other of said potentiometers in circuit with said coil to provide a focus controlling circuit wherein the current flow through said coil is adjustable by said one potentiometer, means connecting an adjustable portion of said other potentiometer to said tube for applying a brightness controlling variable bias voltage thereto, and impedance means connected in parallel circuit relation with said adjustable portion of said other potentiometer for maintaining said tube in focus upon adjustment of said other potentiometer to vary said brightness controlling bias voltage.

RALPH O. HOLBROOK.

REFERENCES CITED

The following references are of record in the file of this patent:

UNITED STATES PATENTS

| Number | Name | Date |
|---|---|---|
| 2,255,485 | Dome | Sept. 9, 1941 |
| 2,430,331 | Galella et al. | Nov. 4, 1947 |
| 2,444,700 | Hillier | July 6, 1948 |
| 2,447,804 | Holst | Aug. 24, 1948 |